United States Patent [19]

Akiba et al.

[11] Patent Number: 5,693,711
[45] Date of Patent: Dec. 2, 1997

[54] RESIN COMPOSITION

[75] Inventors: Isamu Akiba, Tokyo; Hiromichi Nakata; Shiroh Kishii, both of Ibaraki; Atsushi Ohishi, Chiba; Masao Ishii, Ibaraki, all of Japan

[73] Assignee: Kuraray Co., Ltd., Kurashiki, Japan

[21] Appl. No.: 739,292

[22] Filed: Oct. 29, 1996

[30] Foreign Application Priority Data

Oct. 31, 1995 [JP] Japan .................................. 7-306541
May 17, 1996 [JP] Japan .................................. 8-148214

[51] Int. Cl.$^6$ .............................. C08L 53/02; C08L 33/02; A63B 37/12
[52] U.S. Cl. .............................. 525/93; 473/356; 473/378; 473/385
[58] Field of Search .............................. 525/93; 473/356, 473/378, 385

[56] References Cited

U.S. PATENT DOCUMENTS 4,986,545   1/1991   Sullivan .................................. 524/908
5,393,837   2/1995   Kinoshita .................................. 525/92

*Primary Examiner*—David Buttner
*Attorney, Agent, or Firm*—Oblon, Spivak, McClelland, Maier & Neustadt, P.C.

[57] ABSTRACT

There is disclosed a resin composition which comprises:
(a) an α-olefin/unsaturated carboxylic acid copolymer type ionomeric resin; and
(b) a block copolymer having at least one polymer block A comprising an aromatic vinyl compound and at least one polymer block B comprising a conjugated diene compound, and having a hydroxyl group at the terminal of the block copolymer, or a hydrogenated product thereof.

7 Claims, No Drawings

RESIN COMPOSITION

BACKGROUND OF THE INVENTION

1. Field of the Invention

This invention relates to a resin composition comprising an α-olefin/unsaturated carboxylic acid copolymer type ionomeric resin and a specific block copolymer having a hydroxyl group at the terminal thereof. This invention also relates to a resin composition comprising an α-olefin/unsaturated carboxylic acid copolymer type ionomeric resin and a specific block copolymer having a hydroxyl group at the terminal thereof, which is suited for making a cover of a golf ball, and to a golf ball having a cover made of the resin compositions.

2. Description of the Related Art

α-Olefin/unsaturated carboxylic acid copolymer type ionomeric resins are conventionally used in a variety of packaging materials, automobile parts, ski boots and so forth, making the most of their superior toughness, mechanical strength, abrasion resistance, oil resistance and so forth.

However, molded products made of such ionomeric resins generally have a high hardness, and hence it is sought to impart a flexibility to α-olefin/unsaturated carboxylic acid copolymer type ionomeric resins with retaining their toughness, mechanical strength, abrasion resistance, oil resistance and so forth.

In particular, golf balls having covers made of α-olefin/unsaturated carboxylic acid copolymer type ionomeric resins have an advantage in abrasion resistance, compared with golf balls having covers made of "balata" rubbers.

On the other hand, golf balls having covers made of α-olefin/unsaturated carboxylic acid copolymer type ionomeric resins have the problem that the covers have so high a hardness that they give a bad ball shot feeling. Good ball shot feeling is a property strongly required by golfers as a property of golf balls. Therefore, in golf balls having covers made of ionomeric resins, it is sought to impart a flexibility to the covers to improve the ball shot feeling.

As attempts to impart a flexibility to α-olefin/unsaturated carboxylic acid copolymer type ionomeric resins, the following four methods are known.

(i) A method in which a soft type ionomeric resin, i.e., a salt of a terpolymer comprised of an olefin compound, an unsaturated carboxylic acid and an unsaturated monomer such as an acrylate is blended with α-olefin/unsaturated carboxylic acid copolymer type ionomeric resins (see Japanese Patent Application Laid-open No. 1-308577).

(ii) A method in which a saponified product of a specific ethylene/ethyl acrylate copolymer is blended with α-olefin/unsaturated carboxylic acid copolymer type ionomeric resins (see Japanese Patent Application Laid-open No. 5-345051).

(iii) A method in which a hydrogenated product of an aromatic vinyl compound/conjugated diene compound block copolymer is blended with α-olefin/unsaturated carboxylic acid copolymer type ionomeric resins (see U.S. Pat. No. 3,792,124).

(iv) A method in which a thermoplastic elastomer modified with maleic anhydride or the like is blended with α-olefin/unsaturated carboxylic acid copolymer type ionomeric resins (see U.S. Pat. No. 4,986,545).

However, molded products obtained from resin compositions comprised of the α-olefin/unsaturated carboxylic acid copolymer type ionomeric resins described in the above (i) and (ii) can not provide a well satisfactory flexibility. Moreover, the molded products have a poor balance between flexibility and impact resilience, so that golf balls having covers made of such resin compositions, though imparted with a flexibility, have a poor impact resilience, resulting in poor utility.

The resin composition described in the above (iii) can give molded products having a good flexibility. But a poor compatibility of the α-olefin/unsaturated carboxylic acid copolymer type ionomeric resin with the hydrogenated product of an aromatic vinyl compound/conjugated diene compound block copolymer causes the products to have loss of the properties such as toughness, mechanical strength, abrasion resistance and oil resistance derived from the α-olefin/unsaturated carboxylic acid copolymer type ionomeric resin.

The resin composition comprising the thermoplastic elastomer modified with maleic anhydride as in the above (iv) has problems of gelation and yellowing.

SUMMARY OF THE INVENTION

An object of the present invention is to newly provide an α-olefin/unsaturated carboxylic acid copolymer type ionomeric resin composition that can give molded products having a sufficient flexibility and also having superior toughness, mechanical strength, abrasion resistance, oil resistance and so forth. In addition, an object of the present invention is to provide an α-olefin/unsaturated carboxylic acid copolymer type ionomeric resin composition that can give molded products having a sufficient flexibility, also having superior toughness, abrasion resistance, oil resistance and so forth, and having well balanced flexibility and impact resilience, which is suited for making a cover of a golf ball, and to provide a golf ball having a cover made of the resin compositions.

The present inventors have founded that a specific block copolymer having a hydroxyl group at the terminal thereof, or a hydrogenated product thereof, has a good compatibility with the α-olefin/unsaturated carboxylic acid copolymer type ionomeric resin, and the blending of the both gives a resin composition that can solve the problems stated above. Based on the findings, the present inventors have accomplished the present invention as below.

The present invention provides a resin composition comprising;

(a) an α-olefin/unsaturated carboxylic acid copolymer type ionomeric resin; and (b) a block copolymer having at least one polymer block A comprising an aromatic vinyl compound and at least one polymer block B comprising a conjugated diene compound, and having a hydroxyl group at the terminal of the block copolymer, or a hydrogenated product thereof.

Further, the present invention provides a resin composition for making a cover of a golf ball which comprises;

(a) an α-olefin/unsaturated carboxylic acid copolymer type ionomeric resin; and (b) a block copolymer having at least one polymer block A comprising an aromatic vinyl compound and at least one polymer block B comprising a conjugated diene compound, having a hydroxyl group at the terminal of the block copolymer, where, in the polymer block B, cabon-carbon double bond derived from the conjugated diene compound are hydrogenated at a ratio of at least 70%;

the ionomeric resin (a) and the block copolymer (b) being in a weight ratio of (a)/(b)=98/2 to 50/50.

Furthermore, the present invention provides a golf ball having a cover made of the resin composition as above (the latter).

DETAILED DESCRIPTION OF THE INVENTION

The resin composition of the present invention (which includes the resin composition for making a cover of a golf ball) contains an α-olefin/unsaturated carboxylic acid copolymer type ionomeric resin (a). This ionomeric resin (a) is meant to be a resin comprising a copolymer comprised of an α-olefin such as ethylene or propylene and an unsaturated carboxylic acid such as acrylic acid, methacrylic acid, itaconic acid or maleic acid, or a copolymer comprised of an α-olefin, an unsaturated carboxylic acid and an ester thereof, at least a part of the carboxylic group of which copolymer forms a salt with a cation of a metal such as sodium, potassium, lithium, copper, magnesium, zinc or aluminum.

In the present invention, known resins can be used as the α-olefin/unsaturated carboxylic acid copolymer type ionomeric resin, without any particular limitations. For example, commercially available products such as SURLYN (trade mark), available from DuPont Polymers Co., HI-MILAN (trade mark), available from Mitsui DuPont Polychemical Co. Ltd., and IOTEK (trade name), available from Exxon Chemical Co. can preferably be used. The α-olefin/unsaturated carboxylic acid copolymer type ionomeric resin (a) can be used alone, or can be used in combination of two or more kinds.

The resin composition of the present invention (which includes the resin composition for making a cover of a golf ball) also contains a block copolymer having at least one polymer block A comprising an aromatic vinyl compound and at least one polymer block B comprising a conjugated diene compound, and having a hydroxyl group at the terminal thereof, or a hydrogenated product thereof [hereinafter these are called "block copolymer (b)"]. Such a block copolymer (b) includes block copolymers represented by the following Formulas (1) to (4) or hydrogenated products thereof.

(A-B)$_k$-OH    (1)

(B-A)$_l$-OH    (2)

A-(B-A)$_m$-OH    (3)

B-(A-B)$_n$-OH    (4)

wherein A represents the polymer block A; B represents the polymer block B; and k, l, m and n each represent an integer of 1 to 5.

The block copolymer (b) can be used alone, or can be used in combination of two or more kinds.

The aromatic vinyl compound that constitutes the polymer block A in the block copolymer (b) used in the present invention includes, e.g., styrene, α-methylstyrene, o-, m- or p-methylstyrene, 4-propylstyrene, 1,3-dimethylstyrene, vinylnaphthalene and vinylanthracene. In particular, styrene and α-methylstyrene are preferred. These aromatic vinyl compounds can each be used alone, or can be used in combination of two or more kinds.

The aromatic vinyl compound is preferably contained in the block copolymer (b) in an amount of from 5 to 75% by weight, and more preferably from 10 to 65% by weight.

The conjugated diene compound, that constitutes the polymer block B in the block copolymer (b), includes, e.g., 1,3-butadiene, isoprene, 2,3-diemthyl-1,3-butadiene, 1,3-pentadiene and 1,3-hexadiene. In particular, isoprene and 1,3-butadiene are preferred. These conjugated diene compounds can each be used alone, or can be used in combination of two or more kinds.

There are no particular limitations on the structure of the polymer block B in the block copolymer (b), and also there are no particular limitations on the content of 1,2-bonds or 3,4-bonds in the polymer block B.

The polymer block A and the polymer block B in the block copolymer (b) can be combined in the form of linear or branched, or any desired combination of these.

In the block copolymer (b), the hydroxyl group can be attached to the terminal of either the polymer block A or the polymer block B, and can preferably be attached to the terminal of the polymer block A, which is the hard segment, and can more preferably be attached to the terminal of the polymer block comprised of styrene. The hydroxyl group attached to the terminal of the block copolymer can preferably be present in such an amount that the number thereof is not less than 0.5 per molecule of the block copolymer (b), and more preferably not less than 0.6 per molecule of the block copolymer (b).

The block copolymer (b) used in the present invention can preferably have a number average molecular weight of from 30,000 to 1,000,000, and more preferably from 40,000 to 300,000, without any particular limitations.

The block copolymer (b) can be produced by known methods without any particular limitations. For example, it can be produced by the following anionic polymerization process. That is, using an alkyl lithium compound as an initiator, the aromatic vinyl compound and the conjugated diene compound are successively polymerized in an inert organic solvent such as n-hexane and cyclohexane, and ethylene oxide or propylene oxide is added at the time the product has come to get the desired molecular structure and molecular weight, followed by addition of a compound having an active hydrogen such as alcohols, carboxylic acids or water to terminate the polymerization. Thus, the block copolymer (b) can be obtained.

The block copolymer (b) obtained as described above can optionally be hydrogenated.

As an example for the hydrogenation, a method can be used in which the block copolymer (b) obtained as described above is subjected to hydrogenation in an inert organic solvent such as n-hexane or cyclohexane in the presence of a hydrogenating catalyst such as a Ziegler type catalyst comprised of an alkyl aluminum compound and cobalt or nickel, under conditions of a reaction temperature of from 20° to 150° C. and a hydrogen pressure of from 1 to 150 kg/cm$^2$.

The ratio of hydrogenation can be appropriately controlled in accordance with physical properties to be desired for the molded product obtained from the resin composition. When good heat resistance and weatherability are desired, preferebly at least 50% of the carbon-carbon double bonds in the polymer block B, where the double bonds are derived from the conjugated diene compound, can be hydrogenated, and more preferably at least 70% thereof can be hydrogenated. Especially, When the resin composition is used for making a cover of a golf ball, at least 70% of the carbon-carbon double bonds in the polymer block B, where the double bonds are derived from the conjugated diene compound, must be hydrogenated. Preferably, at least 80%, and more preferably, at least 90% thereof can be hydrogenated.

To know the ratio of hydrogenation of carbon-carbon double bonds in the polymer block B, where the double bonds are derived from the conjugated diene compound, the content of carbon-carbon double bonds before and after the hydrogenation is measured by iodine value measurements, infrared spectrophotometry, nuclear magnetic resonance spectroscopy or the like, followed by calculation from the results obtained.

In the resin composition of the present invention, the α-olefin/unsaturated carboxylic acid copolymer type ionomeric resin (a) and the block copolymer (b) can be blended in any weight ratio determined in accordance with the purpose for which the resin composition is used. Usually, their weight ratio is within the range of ionomeric resin (a)/block polymer (b)=98/2 to 2/98, preferably from 95/5 to 5/95, and more preferably from 90/10 to 10/90.

Especially when the resin composition is used for making a cover of a golf ball, the weight ratio must be within the range of ionomeric resin (a)/block polymer (b)=98/2 to 50/50, and preferably from 95/5 to 60/40. This is because, if the weight ratio of the block copolymer (b) is smaller than the lower limit of the above range, almost no flexibility can be imparted to the cover of a golf ball obtained from the resin composition and no improvement in ball shot feeling can be seen.

On the other hand, if the weight ratio of the block copolymer (b) is larger than the upper limit of the above range, the cover of a golf ball obtained from the resin composition has a sufficient flexibility but undesirably have poor properties in respect of toughness, oil resistance and so forth which are derived from the α-olefin/unsaturated carboxylic acid copolymer type ionomeric resin.

In the resin composition of the present invention (which includes the resin composition for making a cover of a golf ball), styrenic resin, polyolefin resin, polyoxymethylene resin, polyphenylene ether resin, a thermoplastic elastomer such as a polyester elastomer or polyurethane, or the like can be blended so long as its properties are not lost. A plasticizer such as process oil, low-molecular weight polyethylene or polyethylene glycol can also be blended. Further, in the resin composition of the present invention, an inorganic filler such as talc, calcium carbonate, kaolin or titanium oxide can be blended.

In the resin composition of the present invention (which includes the resin composition for making a cover of a golf ball), a filler such as glass fiber or carbon fiber, a stabilizer such as anti-oxidant, an antiozonant, a light stabilizer, a UV stabilizer or the like, an antistatic agent, a die lubricant, a slip agent, a flame retardant, a foaming agent, a pigment, a dye, a brightening agent and so forth can be added for the purpose of modifying its properties.

The resin composition of the present invention (which includes the resin composition for making a cover of a golf ball) can be prepared by, e.g., using a mixing machine such as a single-screw extruder, a twin-screw extruder, a kneader, a Banbury mixer or a roll.

The resin composition thus obtained can be molded by a variety of conventionally known molding methods, e.g., by compression molding, injection molding, blow molding, press molding, extrusion or calendering.

The resin composition of the present invention has a good moldability, and gives molded products having a sufficient flexibility, superior toughness, mechanical strength, abrasion resistance, oil resistance and so forth. So, making the most of such features, the resin composition of the present invention can be utilized in various fields of, e.g., mechanical parts, automobile parts, parts of electric appliance, toys, stationery, industrial parts, belts, hoses, footwear, medical supplies, vibration dampers, daily necessities, sundries, construction materials, sheets, films, blow molded articles and other various molded products, as well as hot-melt adhesives or pressure-sensitive adhesives, and materials for adhesive layers of laminated products. In particular, when the ratio of hydrogenation of the block copolymer (b) and the weight ratio of the ionomeric resin (a) to the block copolymer (b) are set within the specific ranges, the resin composition of the present invention is useful for making a cover of a golf ball having well balanced flexibility and impact resilience, and can give a golf ball with good ball shot feeling.

EXAMPLES

The present invention will be described specifically by giving Examples.

In the following Reference Examples, the number average molecular weight of each polymer indicates a molecular weight as measured by gel permeation chromatography (GPC) with polystyrene standard. The content of the aromatic vinyl compound in the block copolymer, the ratio of hydrogenation and the content of hydroxyl groups per molecule of the polymer are calculated from measurements of $^1$H-NMR.

Reference Example 1

(Production of Block Copolymer)

Into a reaction vessel with a stirrer, 50 kg of cyclohexane, 1,750 g of well dehydrated styrene and 175 g of sec-butyl lithium (10% by weight, cyclohexane solution) were charged to carry out polymerization at 60° C. for 60 minutes. Next, 6,500 g of isoprene was added to carry out polymerization for 60 minutes, and 1,750 g of styrene was further added to carry out polymerization for 60 minutes. Thereafter, 12 g of ethylene oxide was added, and finally methanol was added to terminate the reaction. Thus, a styrene-isoprene-styrene type block copolymer having a hydroxyl group at the terminal of the block copolymer (hereinafter simply referred to as "SIS-OH") was obtained. The SIS-OH obtained had a number average molecular weight of 51,800 and a styrene content of 35% by weight, where the number of hydroxyl groups attached to the terminal of the block copolymer per molecule of the block copolymer was 0.85.

This SIS-OH was further subjected to hydrogenation in cyclohexane in the presence of a Ziegler type catalyst and under an atmosphere of hydrogen (50 kg/cm$^2$) to give a hydrogenated product of the SIS-OH (hereinafter simply referred to as "SEPS-OH"). The SEPS-OH thus obtained had a number average molecular weight of 53,000 and a styrene content of 35% by weight, where the number of hydroxyl groups attached to the terminal of the block copolymer per molecule of the block copolymer was 0.85 and the ratio of hydrogenation was 98.5%.

Reference Example 2

(Production of Block Copolymer)

Into a reaction vessel with a stirrer, 50 kg of cyclohexane, 1,400 g of well dehydrated styrene and 210 g of sec-butyl lithium (10% by weight, cyclohexane solution) were charged to carry out polymerization at 60° C. for 60 minutes. Next, 7,200 g of a mixture of isoprene and butadiene (weight ratio: 50/50) was added to carry out polymerization for 60 minutes, and 1,400 g of styrene was further added to carry out polymerization for 60 minutes. Thereafter, 14 g of ethylene oxide was added, and finally methanol was added to terminate the reaction. Thus, a styrene-isoprene/ butadiene-styrene type block copolymer having a hydroxyl group at the terminal of the block copolymer was obtained. The block copolymer obtained was subjected to hydrogenation under the same conditions as in Reference Example 1 to give a hydrogenated product of the block copolymer (hereinafter simply referred to as "SEEPS-OH-1"). The SEEPS-OH-1 thus obtained had a number average molecular weight of 51,700 and a styrene content of 28% by weight, where the number of hydroxyl groups attached to the terminal of the block copolymer per molecule of the block copolymer was 0.83 and the ratio of hydrogenation was 97.5%.

Reference Example 3

(Production of Block Copolymer)

Into a reaction vessel with a stirrer, 50 kg of cyclohexane, 1,750 g of well dehydrated styrene and 210 g of sec-butyl lithium (10% by weight, cyclohexane solution) were charged to carry out polymerization at 60° C. for 60 minutes. Next, 250 g of tetrahydrofuran was added and 6,500 g of butadiene was also added to carry out polymerization for 60 minutes. Then, 1,750 g of styrene was further added to carry out polymerization for 60 minutes. Thereafter, 14 g of ethylene oxide was added, and finally methanol was added to terminate the reaction. Thus, a styrene-butadiene-styrene type block copolymer having a hydroxyl group at the terminal of the block copolymer was obtained. The block copolymer obtained was subjected to hydrogenation under the same conditions as in Reference Example 1 to give a hydrogenated product of the block copolymer (hereinafter simply referred to as "SEBS-OH-1"). The SEBS-OH-1 thus obtained had a number average molecular weight of 76,100 and a styrene content of 35% by weight, where the number of hydroxyl groups attached to the terminal of the block copolymer per molecule of the block coplymer was 0.92 and the ratio of hydrogenation was 98.9%.

Reference Example 4

(Production of Block Copolymer)

Into a reaction vessel with a stirrer, 50 kg of cyclohexane, 1,500 g of well dehydrated styrene and 115 g of sec-butyl lithium (10% by weight, cyclohexane solution) were charged to carry out polymerization at 60° C. for 60 minutes. Next, 250 g of tetrahydrofuran was added and 7,000 g of isoprene was also added to carry out polymerization for 60 minutes. Then, 1,500 g of styrene was further added to carry out polymerization for 60 minutes. Thereafter, 14 g of ethylene oxide was added, and finally methanol was added to terminate the reaction. Thus, a styrene-isoprene-styrene type block copolymer having a hydroxyl group at the terminal of the block copolymer was obtained. The block copolymer obtained was subjected to hydrogenation under the same conditions as in Reference Example 1 to give a hydrogenated product of the block copolymer (hereinafter simply referred to as "HVSIS-OH"). The HVSIS-OH thus obtained had a number average molecular weight of 78,100 and a styrene content of 30% by weight, where the number of hydroxyl groups attached to the terminal of the block copolymer per molecule of the block copolymer was 0.79 and the ratio of hydrogenation was 88.9%. In addition, 1,4-bonds in the hydrogenated polyisoprene blocks were confirmed to be in a content of 47.7 mol %.

Reference Example 5

(Production of Block Copolymer)

Into a reaction vessel with a stirrer, 50 kg of cyclohexane, 1,750 g of well dehydrated styrene and 175 g of sec-butyl lithium (10% by weight, cyclohexane solution) were charged to carry out polymerization at 60° C. for 60 minutes. Next, 6,500 g of isoprene was added to carry out polymerization for 60 minutes, and 1,750 g of styrene was further added to carry out polymerization for 60 minutes. Thereafter, methanol was added to terminate the reaction. Thus, a styrene-isoprene-styrene type block copolymer was obtained. The block copolymer obtained was subjected to hydrogenation under the same conditions as in Reference Example 1 to give a hydrogenated product of the block copolymer (hereinafter simply referred to as "SEPS-1"). The SEPS-1 thus obtained had a number average molecular weight of 53,000 and a styrene content of 35% by weight, where the ratio of hydrogenation was 98.9%.

Reference Example 6

(Production of Block Copolymer)

Using 120 g of sec-butyl lithium (10% by weight, cyclohexane solution), 1,650 g of styrene, 6,700 g of isoprene and 1,650 g of styrene were successively polymerized in the same manner as in Reference Example 5. Thus, a styrene-isoprene-styrene type block copolymer was obtained. The block copolymer obtained was subjected to hydrogenation under the same conditions as in Reference Example 1 to give a hydrogenated product of the block copolymer (hereinafter simply referred to as "SEPS-2"). The SEPS-2 thus obtained had a number average molecular weight of 101,600 and a styrene content of 35% by weight, where the ratio of hydrogenation was 98.9%.

Examples 1 to 3 and Comparative Examples 1 to 3

HI-MILAN 1652 (trade name; available from Mitsui DuPont Polychemical Co. Ltd.), used as the α-olefin/ unsaturated carboxylic acid copolymer type ionomeric resin (a), was blended with the block copolymer obtained in Reference Examples 1 to 3 and 5 in the proportion as shown in Table 1, followed by melt-mixing at 230° C. with a twin-screw extruder to give resin compositions.

From the resin compositions obtained, test pieces were prepared using an injection molding machine at a molding temperature of 230° C. The moldability of the resin compositions obtained and the hardness, tensile strength and elongation of molded products (test pieces) obtained from the resin compositions were evaluated by the methods described below. Results are shown in Table 1.

Moldability:

According to the method prescribed in ASTM D-1238, melt flow rate (hereinafter simply referred to as "MFR") was measured at 200° C. under a load of 2,160 g, and was regarded as an indication of moldability.

Hardness:

According to the method prescribed in ASTM D-2240, hardness of sheet-shaped molded products (11 cm×11 cm×0.2 cm) was measured using an ASTM D hardness meter, and was regarded as an indication of flexibility.

Tensile strength and elongation:

These were measured according to the method described in JIS K6301. More specifically, dumbbell-shaped test pieces (type JIS-3) were prepared, and a tensile test was carried out using an Instron type universal tester (made by Instron Inc.), at room temperature and at a crosshead speed of 5 cm/minute to measure tensile strength (kg/cm$^2$) and elongation (%). Measurements of the tensilie strength were regarded as an indication for evaluating mechanical strength. Measurements of the elongation were regarded as an indication for evaluating flexibility.

TABLE 1

|  | Example | | | Comparative Example | | |
|---|---|---|---|---|---|---|
|  | 1 | 2 | 3 | 1 | 2 | 3 |
| Ionomeric resin (a): (wt %) | | | | | | |
| HI-MILAN 1652 | 75 | 50 | 25 | 100 | 75 | 25 |
| Block copolymer: (wt %) | | | | | | |
| SEPS-OH | 25 | | | | | |
| SEEPS-OH-1 | | 50 | | | | |
| SEBS-OH-1 | | | 75 | | | |
| SEPS-1 | | | | | 25 | 75 |
| Hardness: (ASTM D) | 38 | 31 | 24 | 46 | 38 | 30 |
| Tensile strength: (kg/cm$^2$) | 186 | 166 | 142 | 207 | 167 | 119 |
| Elongation: (%) | 820 | 840 | 850 | 600 | 510 | 540 |
| MFR: (g/10 min) | 24 | 34 | 20 | 21 | 24 | 20 |

Examples 4 to 8 and Comparative Examples 4, 5

HI-MILAN 1557 and HI-MILAN 1601 (trade names; both available from Mitsui DuPont Polychemical Co. Ltd.), used as the α-olefin/unsaturated carboxylic acid copolymer type ionomeric resin (a), were blended with the block copolymer obtained in Reference Examples 1 to 4 and 6 in the proportion as shown in Table 2, followed by melt-mixing at 230° C. with a twin-screw extruder to give resin compositions.

From the resin compositions obtained, test pieces were prepared using an injection molding machine at a molding temperature of 230° C. The various properties of the obtained resin compositions were evaluated in the same manner as in Example 1. Results are shown in Table 2.

TABLE 2

|  | Example | | | | | Comparative Example | |
|---|---|---|---|---|---|---|---|
|  | 4 | 5 | 6 | 7 | 8 | 4 | 5 |
| Ionomeric resin (a): (wt %) | | | | | | | |
| HI-MILAN 1557 | 35 | 35 | 35 | 35 | 35 | 50 | 35 |
| HI-MILAN 1601 | 35 | 35 | 35 | 35 | 35 | 50 | 35 |
| Block copolymer: (wt %) | | | | | | | |
| SIS-OH | 30 | | | | | | |
| SEPS-OH | | 30 | | | | | |
| SEEPS-OH-1 | | | 30 | | | | |
| SEBS-OH-1 | | | | 30 | | | |
| HVSIS-OH | | | | | 30 | | |
| SEPS-2 | | | | | | | 30 |
| Hardness: (ASTM D) | 41 | 40 | 42 | 44 | 39 | 54 | 45 |
| Tensile strength: (kg/cm$^2$) | 285 | 287 | 290 | 283 | 281 | 300 | 191 |
| Elongation: (%) | 850 | 860 | 860 | 840 | 830 | 650 | 600 |
| MFR: (g/10 min) | 11 | 14 | 13 | 8 | 11 | 11 | 18 |

As is seen from the results shown in Tables 1 and 2, the resin compositions of Examples 1 to 8 have a superior moldability, and give molded products having a sufficient flexibility and a superior mechanical strength.

Reference Example 7

(Production of Block Copolymer)

Into a reaction vessel with a stirrer, 50 kg of cyclohexane, 1,400 g of well dehydrated styrene and 105 g of sec-butyl lithium (10% by weight, cyclohexane solution) were charged to carry out polymerization at 60° C. for 60 minutes. Next, 7,200 g of a mixture of isoprene and butadiene (weight ratio: 50/50) was added to carry out polymerization for 60 minutes, and 1,400 g of styrene was further added to carry out polymerization for 60 minutes. Thereafter, 14 g of ethylene oxide was added, and finally methanol was added to terminate reaction. Thus, a styrene-isoprene/butadiene-styrene type block copolymer having a hydroxyl group at the terminal of the block copolymer was obtained. The block copolymer obtained was subjected to hydrogenation under the same conditions as in Reference Example 1 to give a hydrogenated product of the block copolymer (hereinafter simply referred to as "SEEPS-OH-2"). The SEEPS-OH-2 thus obtained had a number average molecular weight of 103,400 and a styrene content of 28% by weight, where the number of hydroxyl groups attached to the terminal of the block copolymer per molecule of the block copolymer was 0.64 and the ratio of hydrogenation was 97.5%.

Reference Example 8

(Production of Block Copolymer)

Into a reaction vessel with a stirrer, 50 kg of cyclohexane, 1,750 g of well dehydrated styrene and 210 g of sec-butyl lithium (10% by weight, cyclohexane solution) were charged to carry out polymerization at 60° C. for 60 minutes. Next, 250 g of tetrahydrofuran was added and 6,500 g of butadiene was also added to carry out polymerization for 60 minutes. Then, 1,750 g of styrene was further added to carry out polymerization for 60 minutes. Thereafter, 14 g of ethylene oxide was added, and finally methanol was added to terminate the reaction. Thus, a styrene-butadiene-styrene type block copolymer having a hydroxyl group at the terminal of the block copolymer was obtained. The block copolymer obtained was subjected to hydrogenation under the same conditions as in Reference Example 1 to give a hydrogenated product of the block copolymer (hereinafter simply referred to as "SEBS-OH-2"). The SEBS-OH-2 thus obtained had a number average molecular weight of 76,100 and a styrene content of 35% by weight, where the number of hydroxyl groups attached to the terminal of the block copolymer per molecule of the block copolymer was 0.71 and the ratio of hydrogenation was 98.9%.

Reference Example 9

(Production of Block Copolymer)

Into a reaction vessel with a stirrer, 50 kg of cyclohexane, 1,400 g of well dehydrated styrene and 105 g of sec-butyl lithium (10% by weight, cyclohexane solution) were charged to carry out polymerization at 60° C. for 60 minutes. Next, 7,200 g of a mixture of isoprene and butadiene (weight ratio: 50/50) was added to carry out polymerization for 60 minutes, and 1,400 g of styrene was further added to carry out polymerization for 60 minutes. Thereafter, methanol was added to terminate the reaction. Thus, a styrene-isoprene/butadiene-styrene type block copolymer was obtained. The block copolymer obtained was subjected to hydrogenation under the same conditions as in Reference Example 1 to give a hydrogenated product of the block copolymer (hereinafter simply referred to as "SEEPS"). The SEEPS thus obtained had a number average molecular weight of 103,400 and a styrene content of 28% by weight, where the ratio of hydrogenation was 97.3%.

Reference Example 10

(Production of Block Copolymer)

Into a reaction vessel with a stirrer, 50 kg of cyclohexane, 1,750 g of well dehydrated styrene and 210 g of sec-butyl lithium (10% by weight, cyclohexane solution) were charged to carry out polymerization at 60° C. for 60 minutes. Next, 250 g of tetrahydrofuran was added and 6,500 g of butadiene was also added to carry out polymerization for 60 minutes. Then, 1,750 g of styrene was further added to carry out polymerization for 60 minutes. Thereafter, methanol was added to terminate the reaction. Thus, a styrene-butadiene-styrene type block copolymer was obtained. The block copolymer obtained was subjected to hydrogenation under the same conditions as in Reference Example 1 to give a hydrogenated product of the block copolymer (hereinafter simply referred to as "SEBS"). The SEBS thus obtained had a number average molecular weight of 76,100 and a styrene content of 35% by weight, where the ratio of hydrogenation was 98.9%.

Reference Example 11

(Production of Modified Block Copolymer)

100 parts by weight of the hydrogenated block copolymer (SEPS-1) obtained in the above Reference Example 5, 3 parts by weight of maleic anhydride and 0.1 part by weight of PERHEXA 25B (trade name; available from Nippon Oil & Fats Co., Ltd.) as a radical initiator were uniformly dry-blended, and thereafter the mixture obtained was fed to a twin-screw extruder in an atmosphere of nitrogen, where modification with maleic anhydride was carried out at a cylinder temperature of 250° C. From the modified block copolymer thus obtained, unreacted maleic anhydride was removed under reduced pressure with heating to give a modified block copolymer (hereinafter simply referred to as "MAn-SEPS"). $^1$H-NMR measurement showed that the amount of the added maleic anhydride in the MAn-SEPS was 2% by weight.

Examples 9 to 14 and Comparative Examples 6 to 15

HI-MILAN 1652, HI-MILAN 1557 and HI-MILAN 1601 (trade names; all available from Mitsui DuPont Polychemical Co. Ltd.), used as the α-olefin/unsaturated carboxylic acid copolymer type ionomeric resin (a), were blended with the block copolymer obtained in Reference Examples 1,3 and 7 to 11 together with titanium oxide in the proportion as shown in Tables 3 and 4, followed by melt-mixing at 230° C. with a twin-screw extruder to give resin compositions.

From the resin compositions obtained, test pieces were prepared using an injection molding machine at a molding temperature of 230° C. The hardness, tensile strength, modulus in tension ("tensile modulus" in Tables) and oil resistance of molded products (test pieces) obtained from the resin compositions were evaluated by the methods described below. Results are shown in Tables 3 and 4.

Hardness:

According to the method prescribed in ASTM D-2240, hardness of sheet-shaped molded products (11 cm×11 cm×0.2 cm) was measured using an ASTM D hardness meter, and was regarded as an indication of flexibility.

Tensile strength and modulus in tension:

These were measured according to the method described in JIS K6301. More specifically, dumbbell-shaped test pieces (type JIS-3) were prepared, and a tensile test was carried out using an Instron type universal tester (made by Instron Inc.), at room temperature and at a crosshead speed of 5 cm/minute to measure tensile strength (kg/cm$^2$) and modulus in tension (kg/cm$^2$). The mesurements of the tensile strength were regarded as an indication of mechanical strength, and the measurements of modulus in tension were regarded as an indication of toughness.

Oil resistance:

Strip-shaped test pieces (1 cm×6 cm×0.3 cm) were prepared, and were immersed in JIS-1 swelling oil for 7 days. Before and after the immersion, the weight of each test piece was measured, and the ratio of swelling (%) was determined according to the following equation. The ratio of swelling was regarded as an indication of oil resistance.

Ratio of Swelling (%)={(X−Y)/Y}×100

In the equation,

X=(weight of the test piece after immersion in JIS-1 swelling oil)

Y=(weight of the test piece before immersion in JIS-1 swelling oil)

In addtion, the resin composition obtained was molded into strip-shaped sheets of about 3 cm×10 cm in size. Then, two sheets obtained were well heated at 130° C., and wound crosswise around a thread-wound core. Thereafter, the material obtained was put in a golf ball molding die, and preheated at 130° C. for 45 seconds, followed by press molding under application of a pressure of 170 kg/cm$^2$ for 80 seconds. The molded products obtained were well cooled, and thereafter deflashed by means of a grinder to give golf balls.

The properties of the golf balls obtained were evaluated by the following methods. Results are shown in Tables 3 and 4.

Cut resistance:

Using a golf ball cut resistance tester (manufactured by Dumbbell Co.), cut resistance of a golf ball was evaluated by a 2.5 kg V-cut method (height: 80 cm). Evaluation (by visual observation of cover surfaces) was made according to the following criteria.

Evaluation criteria:

| Rank | Criterion |
| --- | --- |
| A: | No scratches are seen. |
| B: | Scratches are a little seen. |
| C: | Scratches are fairly seen. |

Impact resilience (rebound):

Golf balls were dropped on a stone table at a height of 100 cm, and the height (cm) to which the balls rebounded was measured.

Hue:

Visually observed.

Ball shot feeling:

Ball shot feeling perceived when golf balls were shot with a golf club was evaluated according to the following evaluation criteria:

Evaluation criteria:

| Rank | Criterion |
| --- | --- |
| A: | Excellent. |
| B: | Good. |
| C: | A little poor. |

TABLE 3

| | Example | | | Comparative Example | | | | |
|---|---|---|---|---|---|---|---|---|
| | 9 | 10 | 11 | 6 | 7 | 8 | 9 | 10 |
| Formulation | | | | | | | | |
| Ionomeric resin (a): (wt %) | | | | | | | | |
| HI-MILAN 1652 | 75 | 75 | 75 | 75 | 75 | 75 | 75 | 100 |
| Block copolymer: (wt %) | | | | | | | | |
| SEPS-OH | 25 | | | | | | | |
| SEEPS-OH-2 | | 25 | | | | | | |
| SEBS-OH-2 | | | 25 | | | | | |
| SEPS-1 | | | | 25 | | | | |
| SEEPS | | | | | 25 | | | |
| SEBS | | | | | | 25 | | |
| MAn-SEPS | | | | | | | 25 | |
| Other component: (wt %) | | | | | | | | |
| Titanium oxide | 10 | 10 | 10 | 10 | 10 | 10 | 10 | 10 |
| Hardness: (ASTM-D) | 38 | 38 | 38 | 38 | 38 | 39 | 39 | 46 |
| Tensile strength: (kg/cm$^2$) | 187 | 187 | 187 | 162 | 162 | 161 | 130 | 207 |
| Tensile modulus: (kg/cm$^2$) | 550 | 550 | 550 | 510 | 505 | 508 | 550 | 600 |
| Oil resistance: (%) | 0.6 | 0.7 | 0.7 | 0.9 | 1.0 | 1.0 | 0.7 | 0.4 |
| Properties of Golf ball | | | | | | | | |
| Impact resilience: (cm) | 68 | 68 | 68 | 68 | 67 | 67 | 65 | 69 |
| Cut resistance: | B | B | B | C | C | C | C | A |
| Hue: | White | White | White | White | White | White | Pale yellow | White |
| Ball shot feeling: | A | A | A | B | B | B | B | C |

TABLE 4

| | Example | | | Comparative Example | | | | |
|---|---|---|---|---|---|---|---|---|
| | 12 | 13 | 14 | 11 | 12 | 13 | 14 | 15 |
| Formulation | | | | | | | | |
| Ionomeric resin (a): (wt %) | | | | | | | | |
| HI-MILAN 1652 | 35 | 35 | 35 | 35 | 35 | 35 | 35 | 50 |
| HI-MILAN 1601 | 35 | 35 | 35 | 35 | 35 | 35 | 35 | 50 |
| Block copolymer: (wt %) | | | | | | | | |
| SEPS-OH | 30 | | | | | | | |
| SEEPS-OH-2 | | 30 | | | | | | |
| SEBS-OH-s | | | 30 | | | | | |
| SEPS-1 | | | | 30 | | | | |
| SEEPS | | | | | 30 | | | |
| SEBS | | | | | | 30 | | |
| MAn-SEPS | | | | | | | 30 | |
| Other component: (wt %) | | | | | | | | |
| Titanium oxide | 10 | 10 | 10 | 10 | 10 | 10 | 10 | 10 |
| Hardness: (ASTM-D) | 43 | 43 | 43 | 42 | 43 | 43 | 45 | 53 |
| Tensile strength: (kg/cm$^2$) | 287 | 287 | 287 | 195 | 192 | 191 | 257 | 271 |
| Tensile modulus: (kg/cm$^2$) | 173 | 173 | 173 | 124 | 122 | 122 | 172 | 121 |
| oil resistance: (%) | 0.7 | 0.7 | 0.7 | 0.9 | 1.0 | 1.0 | 0.7 | 0.5 |
| Properties of Golf ball | | | | | | | | |
| Impact resilience: (cm) | 60 | 60 | 60 | 60 | 58 | 60 | 57 | 60 |
| Cut resistance: | B | B | B | C | C | C | C | A |
| Hue: White | White | White | White | White | White | Pale | White yellow | |
| Ball shot feeling: | A | A | A | B | B | B | B | C |

As is seen from the results shown in Tables 3 and 4, the resin compositions of Examples 9 to 14 can give golf balls with a cover of a sufficient flexibility, toughness, oil resistance and so forth. They have good impact resilience, good cut resistance and good ball shot feeling and are free from yellowing.

What is claimed is:

1. A resin composition comprising;
   (a) an α-olefin/unsaturated carboxylic acid copolymer type ionomeric resin; and
   (b) a block copolymer having at least one polymer block A comprising an aromatic vinyl compound and at least one polymer block B comprising a conjugated diene compound, and having a hydroxyl group at the terminal of the block copolymer, or a hydrogenated product thereof.

2. The resin composition according to claim 1, wherein the hydroxyl group attached to the terminal of the block copolymer is present in such an amount that the number thereof is not less than 0.5 per molecule of the block copolymer (b).

3. The resin composition according to claim 1, wherein the ionomeric resin (a) and the block copolymer (b) are in a weight ratio of ionomeric resin (a)/block copolymer (b)= 98/2 to 2/98.

4. A resin composition for making a cover of a golf ball which comprises;
   (a) an α-olefin/unsaturated carboxylic acid copolymer type ionomeric resin; and
   (b) a block copolymer having at least one polymer block A comprising an aromatic vinyl compound and at least one polymer block B comprising a conjugated diene compound, having a hydroxyl group at the terminal of the block copolymer, where, in the polymer block B, carbon-carbon double bonds derived from the condjugated diene compound are hydrogenated at a ratio of at least 70%;
   said ionomeric resin (a) and said block copolymer (b) being in a weight ratio of (a)/(b)=98/2 to 50/50.

5. The resin composition for making a cover of a golf ball according to claim 4, wherein the ionomeric resin (a) and the block copolymer (b) are in a weight ratio of (a)/(b)=95/5 to 60/40.

6. A golf ball with a cover made of a resin composition which comprises;
   (a) an α-olefin/unsaturated carboxylic acid copolymer type ionomeric resin; and
   (b) a block copolymer having at least one polymer block A comprising an aromatic vinyl compound and at least one polymer block B comprising a conjugated diene compound, having a hydroxyl group at the terminal of the block copolymer, where, in the polymer block B, carbon-carbon double bonds derived from the condjugated diene compound are hydrogenated at a ratio of at least 70%;
   said ionomeric resin (a) and said block copolymer (b) being in a weight ratio of (a)/(b)=98/2 to 50/50.

7. A golf ball according to claim 6, wherein the ionomeric resin (a) and the block copolymer (b) are in a weight ratio of (a)/(b)=95/5 to 60/40.

* * * * *

UNITED STATES PATENT AND TRADEMARK OFFICE
CERTIFICATE OF CORRECTION

PATENT NO. : 5,693,711
DATED : December 2, 1997
INVENTOR(S) : Isamu Akiba, et. al.

It is certified that error appears in the above-identified patent and that said Letters Patent is hereby corrected as shown below:

Column 2, line 63, "cabon-carbon" should read --carbon-carbon--.

Column 4, line 59, "When" should read --when--.

Column 5, line 46, "lublicant" should read --lubricant--.

Column 16, lines 4 and 5, "condjugated" should read --conjugated--.
         lines 23 and 24, "condjugated" should read --conjugated--.

Signed and Sealed this

Twenty-second Day of September, 1998

Attest:

BRUCE LEHMAN

*Attesting Officer*      *Commissioner of Patents and Trademarks*